United States Patent
Jain et al.

(10) Patent No.: US 9,721,000 B2
(45) Date of Patent: Aug. 1, 2017

(54) GENERATING AND USING A CUSTOMIZED INDEX

(71) Applicant: MICROSOFT CORPORATION, Redmond, WA (US)

(72) Inventors: Utkarsh Jain, Bellevue, WA (US); Fan Wang, Sammamish, WA (US); Martin Irman, Richmond (CA); Andrija Antonijevic, Bellevue, WA (US); Xingtao Wei, Coquitlam (CA); Syed Jawad, Vancouver (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 695 days.

(21) Appl. No.: 13/722,544

(22) Filed: Dec. 20, 2012

(65) Prior Publication Data

US 2014/0181122 A1    Jun. 26, 2014

(51) Int. Cl.
     *G06F 17/30*      (2006.01)

(52) U.S. Cl.
     CPC ............................... *G06F 17/30631* (2013.01)

(58) Field of Classification Search
     None
     See application file for complete search history.

(56) References Cited

U.S. PATENT DOCUMENTS

| | | |
|---|---|---|
| 7,634,466 B2 | 12/2009 | Rose et al. |
| 8,244,700 B2 | 8/2012 | Permandla et al. |
| 2005/0102270 A1* | 5/2005 | Risvik ............... G06F 17/30864 |
| 2006/0106792 A1* | 5/2006 | Patterson .......... G06F 17/30616 |
| 2006/0282455 A1* | 12/2006 | Lee ................... G06F 17/30864 |
| 2008/0033934 A1* | 2/2008 | Richards ........... G06F 17/30979 |
| 2008/0059432 A1 | 3/2008 | Tan et al. |

OTHER PUBLICATIONS

Aksyonoff, "Sphinx 2.0.6-release Reference Manual," Published on: Jul. 22, 2012, 196 pp. Available at: http://sphinxsearch.com/docs/current.html.

Busch, et al., "Earlybird: Real-Time Search at Twitter," In Proceedings of the IEEE 28th International Conference on Data Engineering, Apr. 1, 2012, 10 pages.

(Continued)

*Primary Examiner* — Tyler Torgrimson
(74) *Attorney, Agent, or Firm* — Shook, Hardy & Bacon, LLP

(57) ABSTRACT

In various embodiments, systems and methods are provided for generating and using a customized index. In embodiments, an index structure is constructed to efficiently utilize machines containing index portions. In this regard, the index structure for a particular application is customizable such that a number of virtual index units for a particular index type and/or a number of machines associated with the virtual index units for the particular index type can be optimized for machine and/or system performance and efficiency. Utilizing the constructed index structure, documents can be distributed to various index units, virtual index units, and/or machines in real-time or near real-time. Further, the customized index structure can be used to efficiently serve search results in response to search queries.

20 Claims, 9 Drawing Sheets

(56) References Cited

OTHER PUBLICATIONS

Joesciallo, "Printable Indexing and Search Service Administration Guide," 126 pp., Retrieved on: Nov. 8, 2012, Available at: https://wikis.oracle.com/display/CommSuite/Printable+Indexing+and+Search+Service+Administration+Guide.
"The Splunk Guide to Operational Intelligence," Retrieved on: Nov. 8, 2012, 13 pp., Available at: http://www.splunk.com/web_assets/pdfs/secure/Splunk_Guide_to_Operational_Intelligence.pdf.
"Sumo Logic Free Delivers Enterprise Class Operational Insights from Machine Data at No Cost," Retrieved on: Nov. 8, 2012, 4 pp., Mountain View, CA., Available at: http://www.sumologic.com/follow-us/press/2012-06-25-sumo-logic-free-delivers-enterprise-class-operational-insights-from-machine-data-at-no-cost.html.

* cited by examiner

GENERATING AND USING A CUSTOMIZED INDEX

BACKGROUND

Keyword searching of large document collections has become a routine activity for many types of businesses and consumers. The interface provided to a user for performing a keyword search can be relatively simple, and lists of responsive documents are often provided in a few seconds or less. However, extensive resources are required to provide this functionality. This can include large groupings of computers that can maintain information about the documents in a large document collection, and that can further allow for rapid identification of documents that are responsive to search queries.

SUMMARY

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

In various embodiments, systems and methods are provided for generating and using a customized index. In embodiments, an index structure is constructed to efficiently utilize machines containing index portions. In this regard, the index structure for a particular application is customizable such that a number of virtual index units for a particular index type and/or a number of machines associated with the virtual index units for the particular index type can be optimized for machine and/or system performance and efficiency. Utilizing the constructed index structure, documents can be distributed to various index units, virtual index units, and/or machines in real-time or near real-time. Further, the customized index structure can be used to efficiently serve search results in response to search queries.

BRIEF DESCRIPTION OF THE DRAWINGS

The invention is described in detail below with reference to the attached drawing figures, wherein.

DETAILED DESCRIPTION

Figure 1:
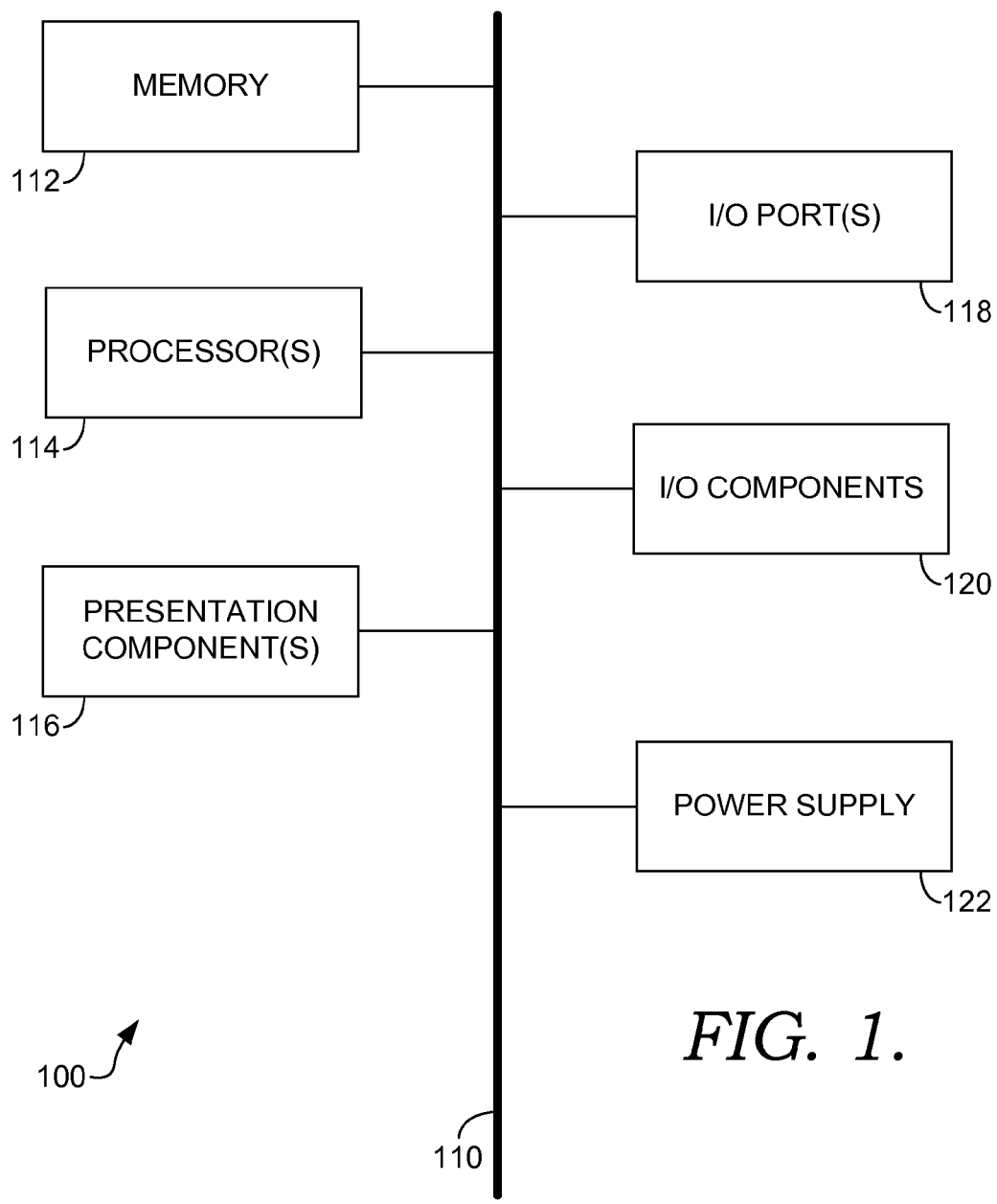
FIG. 1 is a block diagram of an exemplary computing device suitable for implementing embodiments of the present invention.

In various embodiments, systems and methods are provided for generating and using a customized index. In embodiments, an index structure is constructed to efficiently utilize machines containing index portions. In this regard, the index structure for a particular application is customizable such that a number of virtual index units for a particular index type and/or a number of machines associated with the virtual index units for the particular index type can be optimized for machine and/or system performance and efficiency. Such a customization enables, among other things, an index size or index unit size to be more readily increased in size and an efficient utilization of machine storage (e.g., memory, solid-state drive (SSD), etc.)

Utilizing the constructed index structure, documents can be distributed to various index units, virtual index units, and/or machines in real-time or near real-time. That is, upon downloading or obtaining a document and selecting an index unit, virtual index unit, and/or machine to which to distribute a particular document, the document can be transmitted thereto without requiring the index, or a portion thereof, to be offline. As various virtual index units can have different portions of an index, embodiments of the present invention maintain coordination between the index generation, document distribution, and/or query serving.

Embodiments of the invention described herein include one or more computer-storage media storing computer-useable instructions that, when executed by a computing device, perform a method for distributing documents. The method includes identifying a particular virtual matching index unit within an index unit to which to provide a document, wherein machines associated with the particular virtual matching index unit have a same matching index portion. The method also includes identifying a particular virtual ranking index unit from among a plurality of virtual ranking index units within the index unit to which to provide the document, wherein machines associated with the particular virtual ranking index unit have a same ranking index portion. The method further includes identifying a particular virtual content index unit from among a plurality of virtual content index units within the index unit to which to provide the document, wherein machines associated with the particular virtual content index unit have a same content index portion. Subsequently, the document is provided to each of the machines associated with the identified virtual matching index unit, each of the machines associated with the identified virtual ranking index unit, and each of the machines associated with the identified virtual content index unit.

In a second illustrative embodiment, one or more computer-storage media storing computer-useable instructions that, when executed by a computing device, perform a method for serving queries. The method includes receiving at least a portion of a query. The query, or portion thereof, is communicated to a machine within each virtual matching index unit within an index unit. Document identifiers associated with documents deemed relevant to the at least the portion of the query are received. Such document identifiers are used to determine a hash value for each document. Based on the hash value, a virtual ranking index unit and a virtual content index unit are identified for each document from which to obtain data.

In a third illustrative embodiment, an index system is provided. The index system includes a plurality of index units, wherein each index unit comprises a portion of a search index that has a set of machines dedicated to a particular group of web documents. Each of the index units includes a set of virtual matching index units, a set of virtual ranking index units, and a set of virtual content index units. The number of units within each of the set of virtual matching index units, the set of virtual ranking index units, and the set of virtual content index units being customized in accordance with the search index. Each of the virtual matching index units is associated with a first number of machines, each of the virtual ranking index units is associated with a second number of machines, and each of the virtual content index units is associated with a third number of machines. The first number of machines, the second number of machines, and the third number of machines are customized in accordance with the search index.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media. Computer storage media includes volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As defined herein, computer storage media does not include communication media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like.

As previously described, in accordance with various embodiments of the present invention, a search index for a particular application can be customized to improve utilization of machines within an index-serving system. Such an index-serving system includes a set of machines having multiple index types that are utilized to identify and serve search results relevant to a search query. In this regard, a first application might have a first index customization, and a second application might have a second index customization. Further, an index-serving system associated with a particular application may be modified to more efficiently utilize machines within the index-serving system. Various applications may include, for example, a search application, a social networking application, an instant answer application, a news application, etc. By way of example only, based on properties and/or functionality of a particular application, the index-serving system associated therewith can be configured to include a different number of virtual index units and/or machines associated with various index types, such as a matching index, ranking index, content index, and/or document index as compared to those designated in association with another application in order to improve utilization. In this regard, if a particular application has a low content workload, the number of machines that contain the same copy of the content file may be reduced.

Figure 2:
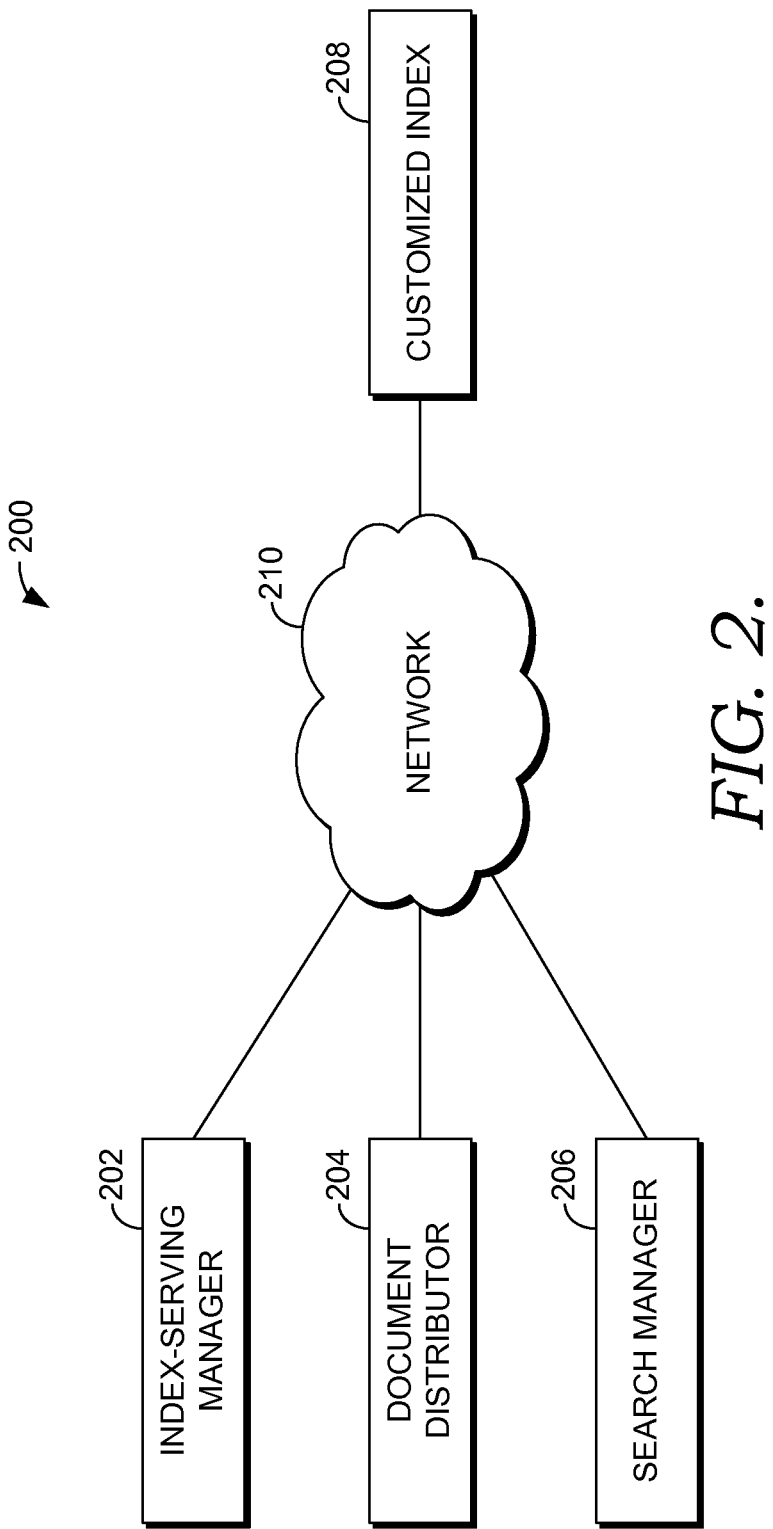
FIG. 2 is a schematic diagram of an exemplary environment of a suitable index-serving system, in accordance with embodiments of the present invention.

Referring now to FIG. 2, a block diagram is provided illustrating an exemplary index-serving system 200 in which embodiments of the present invention may be employed. Generally, the index-serving system 200 illustrates an environment in which an index is generated and/or served in real-time.

Among other components not shown, the index-serving system 200 generally includes an index-serving manager 202, a document distributor 204, a search manager 206, and a customized index 208, all in communication with one another via a network 210. The network 210 may include, without limitation, one or more local area networks (LANs) and/or wide area networks (WANs). Such networking environments are commonplace in offices, enterprise-wide computer networks, intranets and the Internet. Accordingly, the network 210 is not further described herein.

It should be understood that any number of index-serving managers, document distributors, search managers, and customized indices may be employed in the index-serving system 200 within the scope of embodiments of the present invention. Each may comprise a single device/interface or multiple devices/interfaces cooperating in a distributed environment. For instance, the document distributor 204 may comprise multiple devices and/or modules arranged in a distributed environment that collectively provide the functionality of the document distributor 204 described herein. Additionally, other components/modules not shown also may be included within the index-serving system 200.

It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of computing devices. By way of example only, the search manager 206 might be provided as a single server (as shown), a cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The index-serving manger 202, the document distributor 204, and the search manager 206 may be or include any type of computing device(s), such as the computing device 100 described with reference to FIG. 1, for example.

In operation, the index-serving manager 202 is configured to manage the infrastructure of the customized index 208. In this regard, the index-serving manager 202 can identify or determine the structure or configuration of index units, virtual index units, and machines functioning as part of the customized index 208. Such a configuration can be determined based on characteristics of the particular application associated with the index-serving system 200. For example, the index-serving manager 202 may identify and/or analyze workload for each index type, index size for each index type, machine data store capacity (e.g., memory and/or SSD), and/or the like. Upon identifying and/or analyzing such information, the index-serving manager 202 may be able to determine data related to an optimal or improved structure to an index, such as, for example, a number of index units, a number of machines in a virtual unit, a number of sets of an index type, a number of machines in an index set (i.e., a number of machines to host the same copy of an index type), etc. In embodiments, different provisioning of machines for various indices may occur based on actual workload of the corresponding index.

In various embodiments, the customized index 208 can be constructed in any number of suitable manners. As an example, a wide area network (such as the internet) can include billions of documents. In order to efficiently provide results to a user in response to a search query, these documents can be processed ahead of time or in real-time to form a search index. Initially, documents that should be considered for inclusion in a document corpus for a search index can be identified. Although billions of documents may be available, some of the documents may be of low interest for any of a variety of reasons. Thus, it may be desirable to have a document corpus that includes only a subset of the available documents. The identification of documents for inclusion in a search index can be performed in any convenient manner. Some documents can be excluded based on a characteristic of the document, such as whether the document is available in a default language. Other documents might be excluded based on the content of the document, such as based on whether the document has less than a threshold amount of text or data, or whether the nature of the content indicates subject matter that is inappropriate for the desired search index. Any other convenient method can also be used for identifying documents for inclusion in a document corpus.

After determining documents that will be included in a search index, a table(s) can be constructed that can correlate keywords with the content of documents. In this discussion, a "keyword" is generally used to refer to any string of characters or other token that can be used to identify matching documents based on a search query. Thus, a keyword could be a string of numbers, a chemical formula, or any other string that includes alphanumeric and/or non-alphanumeric characters. Keywords can also be referred to as tokens in some instances. Note that a keyword may actually represent only a portion of a conventional word, or a keyword could represent multiple conventional words. For a given keyword, the table(s) can identify all of the documents that contain the keyword. Optionally, the table(s) can include information about other types of document features that may be useful as part of a search process. For example, the table can further include information about how many times a keyword occurs or information about where a keyword occurs in a document. This type of table can be referred to as an inverted index.

Another process that can be performed on the documents is dividing the documents into chunks of documents. A chunk of documents can represent a group of documents that can be processed together. A chunk can include any convenient number of documents, such as tens or hundreds or thousands or more. In some embodiments, the documents within a chunk may not have any particular relationship to one another. Instead, the purpose of the chunk can simply be to split a large number of documents into groups that have a manageable size.

The formation of the index or indices and the formation of chunks can be performed in any convenient order. For example, the chunks of documents can be formed first, and then an index or indices can be formed for the documents within each chunk. Alternatively, the index or indices could be formed first. When a chunk of documents is formed, the portions of the index related to the documents in the chunk can be identified and used to form a smaller table associated with the chunk.

The chunks of documents can be distributed to a plurality of machines that can participate in generating results responsive to a search query. When the chunks are distributed to the plurality of machines, each machine can receive one or more chunks. If a machine receives more than one chunk, an index can be constructed based on the combination of all of the documents received by a machine. As noted above, the exact order of operations is not critical. The index for a group of chunks can be formed by a central processor and distributed along with the corresponding chunks to a processor. Alternatively, a group of chunks can be distributed to a processor, and then the processor can build the corresponding index.

In accordance with embodiments of the present invention, a chunk of documents can be assigned or designated to a particular index unit within a customized index. An index unit refers to a portion of an index that has a set of machines (i.e., computing devices) dedicated to a particular group of documents (e.g., one thousand documents, one million documents, ten million documents, etc.). In this regard, an index unit is a portion of a search index that is used to identify documents within a specific document range that is relevant to a search query. Accordingly, a customized index includes a plurality of index units such that an entire corpus of documents is analyzed in identifying documents relevant to a search query.

Figure 3:
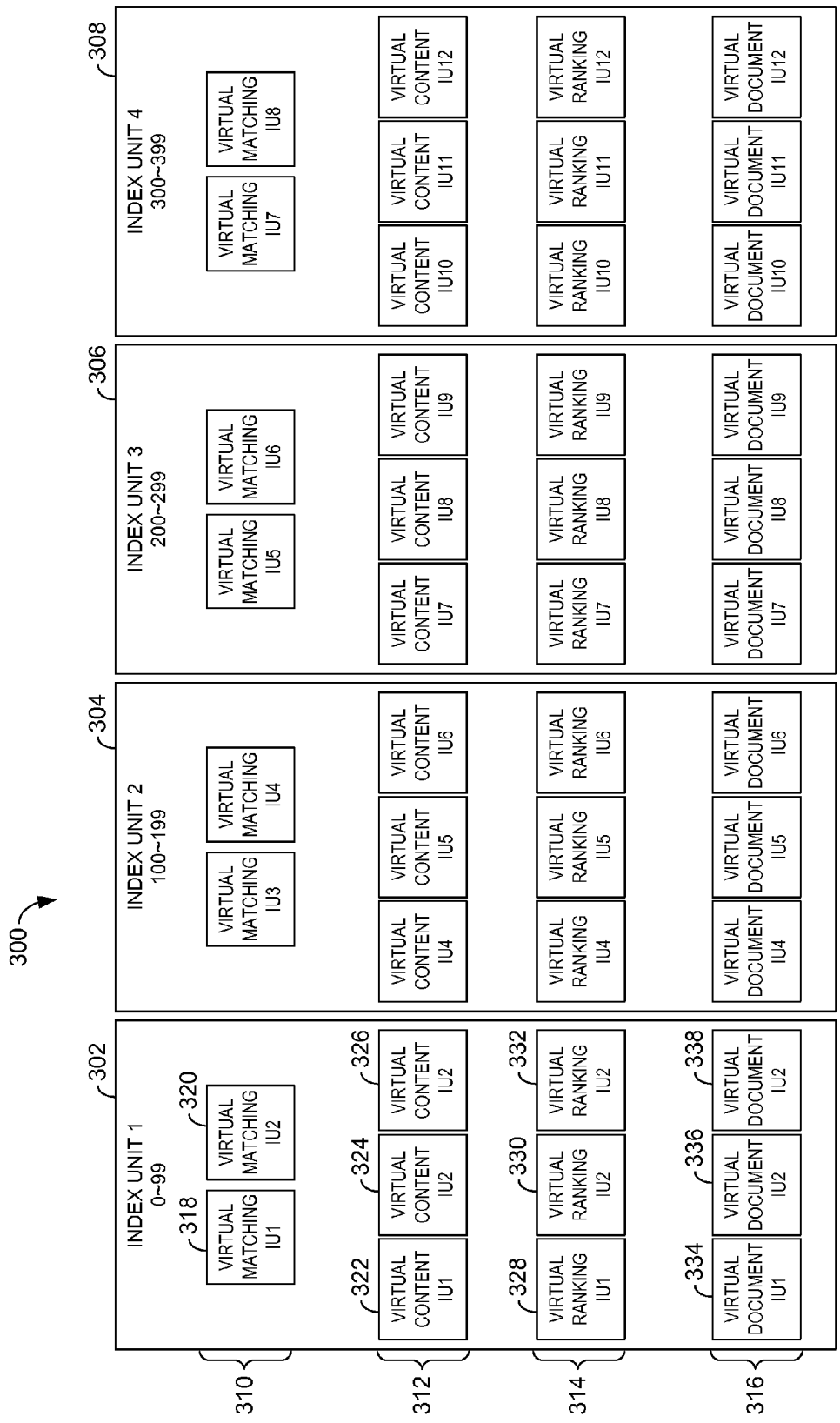
FIG. 3 is a schematic diagram of an example customized index structure, in accordance with an embodiment of the present invention.

By way of example and with reference to FIG. 3, a first index unit 302, a second index unit 304, a third index unit 306, and a fourth index unit 308 are included in a customized index 300. Each index unit can hold a subset of the entire index corpus. In embodiments, the customized index 300 is partitioned into index units 302, 304, 306, and 308 based on a hash range of documents. As illustrated in FIG. 3, the first index unit 302 might have documents, such as web pages, having a hash value from 0-99, the second index unit 304 might have documents having a hash value from 100-199, the third index unit 306 might have documents having a hash value from 200-299, and the fourth index unit 308 might have documents having a hash value from 300-399. In this regard, a document having a hash value falling within a hash range associated with the first index unit 302 (i.e., 0-99) is included in the first index unit 302.

As previously described, each index unit can have multiple types of indices, such as, for example, a matching index, a content index, a ranking index, and/or a document index. A matching index, which may also be referred to as a L1 index, that is utilized to identify search results that match or correspond with a search query. In embodiments, the matching index is an inverted index of terms in the corpus, or portion thereof. For example, given a query, the matching index can identify some candidate documents (e.g., among billions) that are potential results for the query. The matching index may further facilitate a quick ranking and refine the list of candidates (e.g., a potential candidate might be ranked relatively low based on very little anchor and/or click information relating that page with a particular term).

The ranking index (sometimes referred to as the L2 or Per Document Index (PDI)) facilitates ranking a document, or a portion thereof. As such, the ranking index can facilitate generating a relevance score for a document based on a query, or portion thereof. As such, the ranking index can perform or assist with a more expensive computation in terms of looking at where the query terms appear in the document, spacing of query terms, the context or text around the query terms, natural language analysis, and other advanced techniques.

The content index may include content and/or an index thereof. Such content may be document content, text snippets, or the like. The documents index (sometimes referred to as a documents file), refers to an index that facilitates creating updates to an index. Such an index is generally concerned with a number of documents that receive updates (e.g., every second).

For instance, a query might be transmitted to 100 machines for matching, with each machine scanning through ten million documents to identify candidates for the query. A ranking analysis might be performed for the top 500 documents (e.g., as determined by a score computed in association with the matching index). Thereafter, captions or snippets may be generated or obtained for the top ten documents.

Virtual index units within each index unit can be used for each type of index. In this way, a set of one or more virtual index units (VIU) can be used to represent various aspects or portions of an index type. As illustrated in FIG. 3, for example, the first index unit 302 includes a set of virtual index units 310 associated with a matching index type, a set of virtual index units 312 associated with a content index type, a set of virtual index units 314 associated with a ranking index type, and a set of virtual index units 316 associated with a document index type.

The set of virtual index units 310 associated with the matching index type includes a virtual matching index unit 318 and a virtual matching index unit 320. In this way, the virtual matching index unit 318 and the virtual matching index unit 320 can split or divide the matching index corresponding with the first index unit 302. As such, a first portion of a matching index associated with documents within the hash range of 0-99 corresponds with the virtual matching index unit 318, and a second portion of the matching index associated with documents within the hash range of 0-99 corresponds with the virtual matching index unit 320. Such a matching index may be partitioned (e.g., substantially equally) into virtual matching index units in accordance with or based on a hash range of the documents.

The set of virtual index units 312 associated with the content index type includes a virtual content index unit 322, a virtual content index unit 324, and a virtual content index unit 326. In this way, the virtual content index unit 322, the virtual content index unit 324, and the virtual content index unit 326 can split or divide (e.g., substantially equally) the content index corresponding with the first index unit 302. As such, a first portion of a content index associated with documents within the hash range of 0-99 corresponds with the virtual content index unit 322, a second portion of the content index associated with documents within the hash range of 0-99 corresponds with the virtual content index unit 324, and a third portion of the content index associated with documents within the hash range of 0-99 corresponds with the virtual content index unit 326. Such a content index may be partitioned into virtual content index units in accordance with or based on a hash range of the documents.

The set of virtual index units 314 associated with the ranking index type includes a virtual ranking index unit 328, a virtual ranking index unit 330, and a virtual ranking index unit 332. In this way, the virtual ranking index unit 328, the virtual ranking index unit 330, and the virtual ranking index unit 332 can split or divide (e.g., substantially equally) the ranking index corresponding with the first index unit 302. As such, a first portion of a ranking index associated with documents within the hash range of 0-99 corresponds with the virtual ranking index unit 328, a second portion of the ranking index associated with documents within the hash range of 0-99 corresponds with the virtual ranking index unit 330, and a third portion of the ranking index associated with documents within the hash range of 0-99 corresponds with the virtual ranking index unit 332. Such a ranking index may be partitioned into virtual ranking index units in accordance with or based on a hash range of the documents.

The set of virtual index units 316 associated with the document index type includes a virtual document index unit 334, a virtual document index unit 336, and a virtual document index unit 338. In this way, the virtual document index unit 334, the virtual document index unit 336, and the virtual document index unit 338 can split or divide (e.g., substantially equally) the document index corresponding with the first index unit 302. As such, a first portion of a document index associated with documents within the hash range of 0-99 corresponds with the virtual document index unit 334, a second portion of the document index associated with documents within the hash range of 0-99 corresponds with the virtual document index unit 336, and a third portion of the document index associated with documents within the hash range of 0-99 corresponds with the virtual document index unit 338. Such a document index may be partitioned into virtual document index units in accordance with or based on a hash range of the documents.

Machines, such as computing devices (e.g., servers), can be assigned or designated to each of these virtual index units to facilitate generating and/or serving indices. In embodiments, each of the machines associated with a virtual index unit may have the same structure. That is, each machine unit corresponding with a particular virtual index unit may have a copy of the same index, or portion thereof. By way of example, virtual content index unit 322 may represent or may be assigned ten machines each having the same portion of the content index. Multiple machines with the same content may be needed, for example, based on workload capacity that is required or desired. For instance, to handle or process a particular number of queries, multiple machines having the same index, or portion thereof, may be needed.

As previously described, the customized index 300 of FIG. 3 is customizable to improve utilization (e.g., machine utilization) and improve efficiency. Accordingly, various aspects of the present invention enable the number of virtual index units for each index type and/or the number of machines assigned to each virtual index unit to be customized. Such a customization allows a different index serving capacity to be achieved for a particular application. By way of example only, assume that five copies of the content index for a particular chunk of documents are needed (e.g., based on workload requirements). In such a case, only five machines should be assigned to each virtual content index unit associated with the content index. Although FIG. 3 illustrates the set of virtual content index units 312, the set of virtual ranking index units 314, and the set of virtual document index units 316 each having three virtual index units, as described above, these can be customized to any number. As such, each index type might have a different number of corresponding virtual index units. Further, each virtual index unit can be customized to have a particular number of machines corresponding therewith. Similarly, although FIG. 3 shows each of index unit 302, index unit 304, index unit 306, and index unit 308 having the same configuration of virtual index units, each of the index units can be customized so that virtual index units and/or machines associated therewith can be varied in number if desired.

As can be appreciated, in some embodiments, a machine can be part of multiple virtual index units of different types. In this way, a particular machine can serve multiple types of indices. Such a functionality can enable full and/or optimal utilization of storage capacity, such as SSD or memory, based on the needs of different applications.

Returning to FIG. 2, the index-serving manager 202 can, in some embodiments, manage the recovery of the customized index 208. A recovery algorithm can be designed such that a machine serving different types of indices only gets the appropriate parts of the index of the particular type that needs to be recovered during a recovery process. As such, the recovery algorithm may be performed on each virtual index unit independently. An algorithm, such as a majority voting algorithm, can be used to select the best machine to recover a particular chunk of documents.

By way of example only, each virtual index unit includes a list of machines. Assume that recovery is needed for a particular virtual matching index unit, for example, because at least one machine in the virtual index unit does not have the same matching index for a portion of chunks compared with the majority of the machines in this virtual index unit for corresponding chunks. One of the majority machines having a matching index can be selected as a "best machine" and thereby utilized to recover a particular chunk of documents. In embodiments, to determine the majority of a chunk, various features can be extracted from chunks, such as, for instance, file size, document count, and/or check sum.

The document distributor 204 is configured to distribute documents. In this regard, the document distributor 204 can determine an index unit, a virtual index unit, and/or a machine to which a document is to be distributed. A document may be a web page, a collection of web pages, a representation of a document (e.g., a PDF file), another searchable document, or the like. In embodiments, a document may be in its native or original form or a supplemented document, that is, an original document with any annotations and/or metadata that have been associated with the document.

The document distributor 204, or another component, may determine whether to index a document. If a document is designated to index, a determination of which index unit, virtual index unit, and/or machine to transmit the document, and/or data associated therewith, is made. In one embodiment, the document distributor 204 can make such a determination utilizing a hash value associated with the document. In such an embodiment, the document distributor 204, or another component, can determine a hash value associated with the document.

In one implementation, for a particular ingested document to be indexed, the document distributor 204, or another component, can perform a hash algorithm that computes a hash value for the document based on a document key. A document key refers to a unique identifier for a document in the entire indexing system. Generally, a document key is in the form of a string and may be, for example, the URL of the document. The resulting hash value can be used to identify a particular matching index and/or a particular document index to which to provide the document. Thereafter, the document distributor 204, or another component, can assign the document a unique document identifier (i.e., a docID). A document identifier refers to a unique identifier for a document, such as a numerical value. Another hash algorithm can compute a hash value based on the document identifier assigned to the document. The resulting hash value can be used to identify a particular content index and/or a particular ranking index to which to provide the document.

Figure 4:
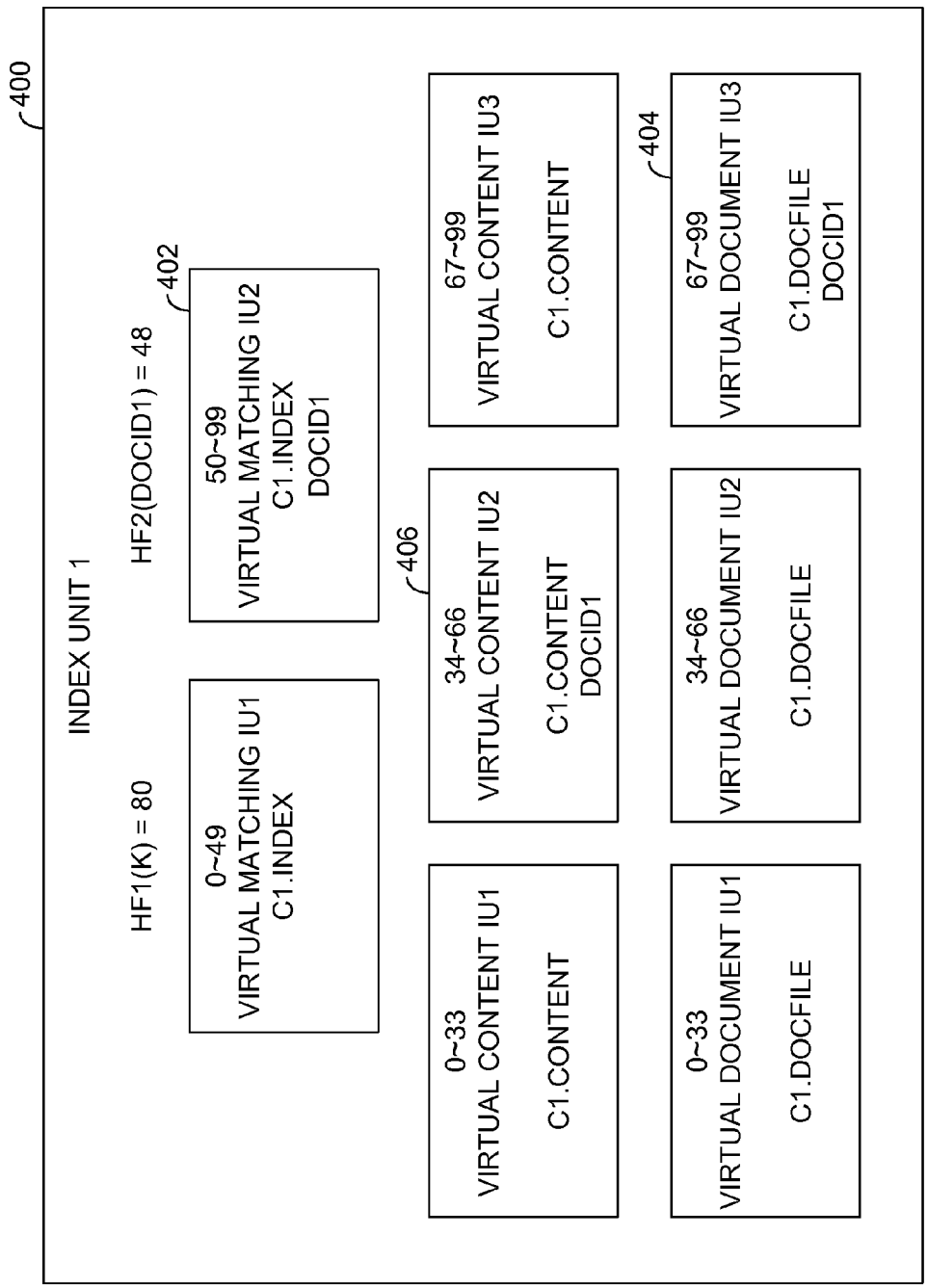
FIG. 4 is a schematic diagram illustrating an example for a document distributing, in accordance with an embodiment of the present invention.

By way of example only, FIG. 4 illustrates an example for a document distributor 204 document routing algorithm. For a particular document, assume a document-key based hash function HF1 computes a hash value for a document key K for use in routing the document to a virtual matching index unit and a virtual document index unit based on the hash value. Now assume that the document-key based hash value is calculated to be 80. The document distributor 204 may utilize a table, algorithm, or other lookup system to determine that the document is to be routed to the second virtual matching index unit 402 within the index unit 400 and the third virtual document index unit 404 within the index unit 400. As such, each machine associated with the second virtual matching index unit 402 and each machine associated with the third virtual document index unit 404 can be provided with the document, and/or data associated therewith. Now assume that another document-identifier based hash function computes a hash value of 48 based on a document identifier assigned to the document. The document distributor 204 may utilize a table, algorithm, or other lookup system to determine that the document is to be routed to the second virtual content index unit 406. As such, each machine associated with the second virtual content index unit 406 can be provided with the document, and/or data associated therewith.

In accordance with determining a location (e.g., an index unit(s), a virtual index unit(s), and/or a machine(s)) to which a particular document should be distributed or transmitted, the document distributor 204 can initiate distribution of the document. In embodiments, distribution of a document includes content and corresponding index. For instance, the matching index (e.g., inverted index) is transmitted to machines within a virtual matching index unit, the content portion is passed to machines in a virtual content index unit, a processed version of the matching index is transmitted to machines in a virtual ranking index unit, and the entire document is transmitted to machines in a virtual document index unit.

Figure 5A:
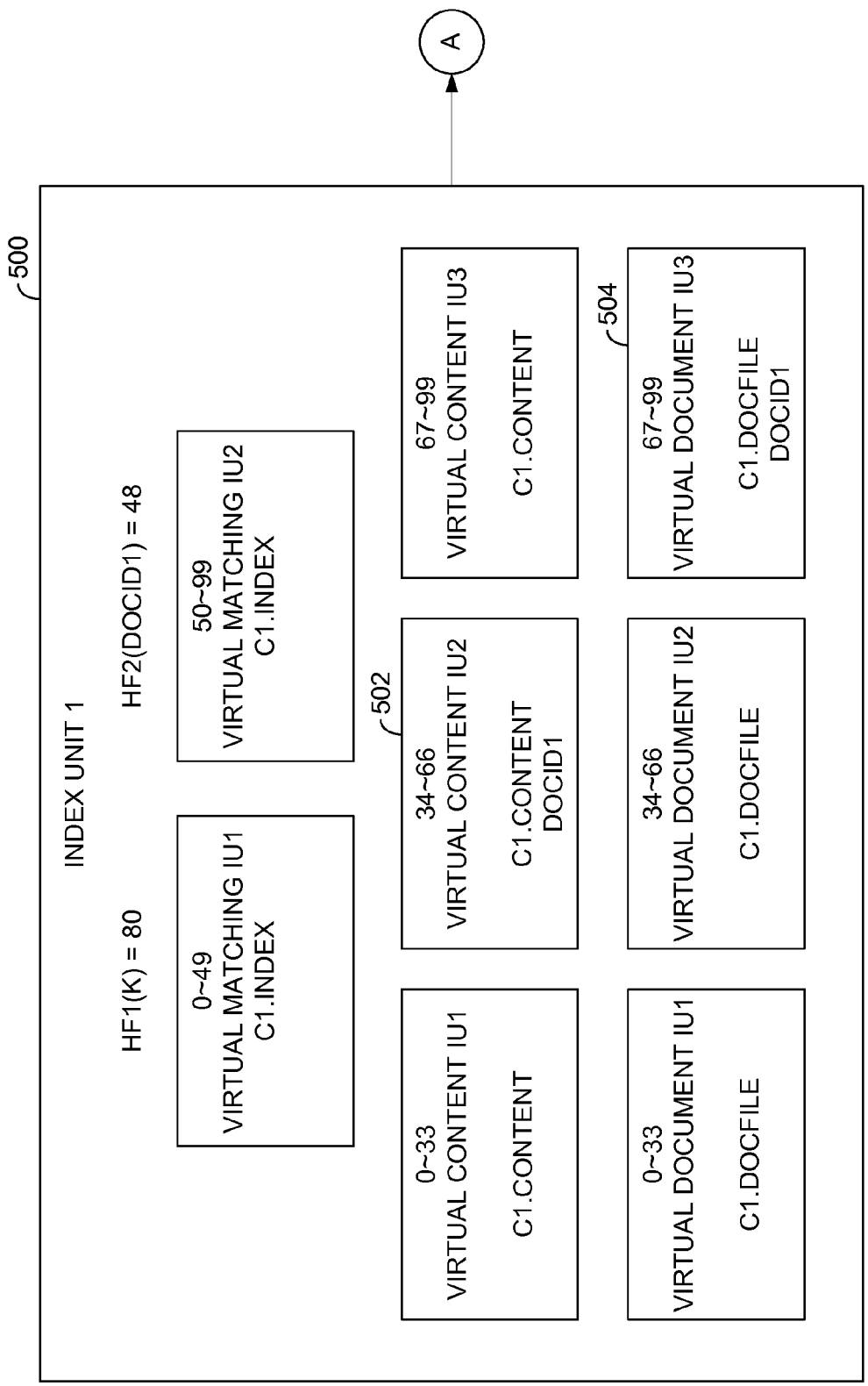
FIGS. 5A-5B are schematic diagrams illustrated an example two-stage document adding process, according to embodiments of the present invention.
Figure 5B:
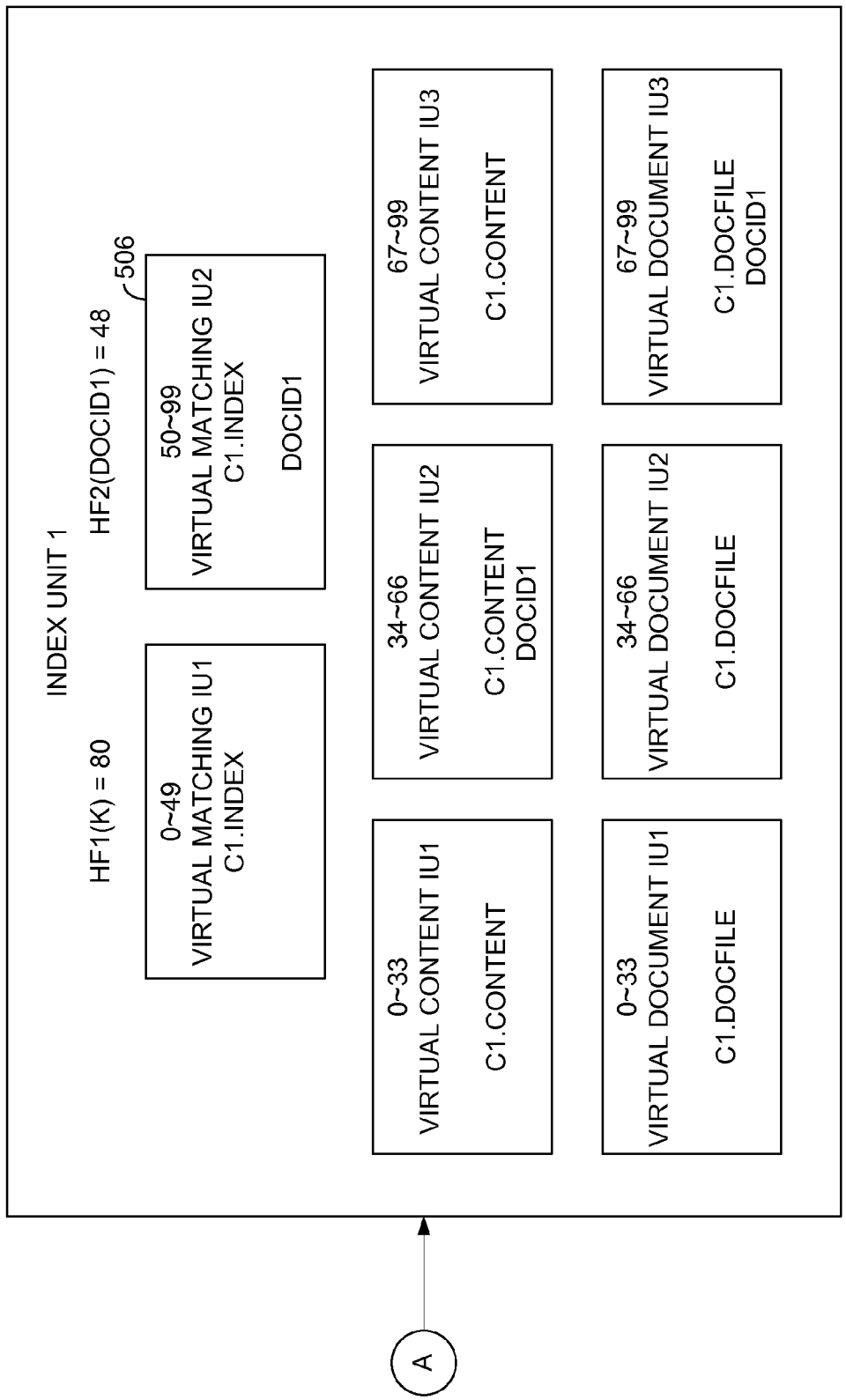

Such a distribution can occur in any manner. In embodiments, the document distributor 204 can utilize a two-stage document adding and/or deleting algorithm to maintain integrity of the index during query serving. With regard to adding a document, the document, or data associated therewith (e.g., a content index portion associated with the document, a ranking index portion associated with the document, a document index portion associated with the document, content, etc.) is initially transmitted to or included in the machines of the virtual index unit associated with the content index, the ranking index, and/or the document index. Thereafter, the document, and/or data associated therewith (e.g., a matching index portion associated with the document) is transmitted to or included in the machines of the virtual matching index unit. By way of example and with reference to FIGS. 5A-5B, initially, a document (or portion thereof) is added to the virtual content index unit 502 within the index unit 500 of FIG. 5A and the virtual document index unit 504 of FIG. 5A. Thereafter, as illustrated in FIG. 5B, the document (or portion thereof) is added to the virtual matching index unit 506.

For deleting a document, the document, and/or data associated therewith, can be deleted directly from machines of the virtual matching index unit and the virtual document index unit using the document key and the document-key hash algorithm. To delete a document from machines of the virtual content index unit and the virtual ranking index unit, a fetch from the virtual document index unit can be performed to fetch the document identifier of the document based on the document key. The fetched document identifier and the document-identifier based hash algorithm can then be used to delete the document from the machines associated with the appropriate virtual content index unit and virtual ranking index unit.

As can be appreciated, in embodiments, decisions on a location for distributing a particular document, and/or data associated therewith, are deterministic as the machine holding that particular document may need to be identified during query evaluation for different index types. Further, such a document location identification and transmission thereto can be performed without disrupting query processing. That is, the index-serving system remains online or live when documents, or data associated therewith, are being transmitted to machines and added to various indices.

Returning again to FIG. 2, in accordance with the customized index 208 being created and distributed among multiple index units, virtual index units, and/or machines, search queries can be processed to provide responsive documents. As an example, at least a portion of a search query can be received from a user by a search interface, such as a web page that includes a query box. The search query, or portion thereof, can be received by a search manager 206 that manages query evaluation. The search manager 206 can receive a query, or portion thereof, and distribute the query, of portion thereof, to the different machines handling the chunks for a search index.

The at least a portion of a search query can represent a full search query provided by an initial search requestor. Alternatively, the at least a portion of a search query can be a query that has been stripped of information not relevant to a search service on the processor. Still another option can be that the portion of the search query represents a search query that has been modified, such as a query where the spelling of a keyword has been changed to match a more popular keyword and/or to correspond to a keyword found in a dictionary.

In implementation, at least a portion of a query can be communicated to each virtual matching index unit within each index unit. As such, the search manager 206 can select a machine (e.g., from among a plurality of machines) associated with each virtual matching index unit within each index unit. As previously described, each virtual matching index unit corresponds with a portion of the documents within an index unit. Accordingly, distributing the query to a machine associated with each virtual matching index unit of an index unit enables evaluation of all the documents corresponding with the index unit. Similarly, each index unit corresponds with a portion of the entire corpus of documents and, as such, distributing the query to each virtual matching index units within each index unit enables evaluation of the entire corpus of documents. The particular machine from each virtual matching index unit can be selected in any manner. For example, a particular machine selected for processing a query may be selected systematically, randomly, based on workload, based on capacity, or the like.

Each of the machines corresponding with the virtual matching index units that receives a query performs a search of documents to identify documents relevant or related to the received search query. In this regard, the matching index can be used to identify or determine documents that match or pertain to the query. In some embodiments, multiple levels of searches may be performed. For example, an initial search may apply to all documents. Upon identifying a set of documents that might be relevant, a second search may be applied to those documents to further narrow, refine, or filter the results.

In performing the search, in some embodiments, the machine associated with the virtual matching index unit may parse the query into keywords that are relevant for the particular search index. In other embodiments, the query parsing can be performed by the search manager 206, or other component. After the query is parsed, the machine (e.g., an index file manager on the machine) can evaluate the query against the documents in the chunks associated with that machine.

Upon performing the searches, relevant or related document identifiers identifying the documents can be provided, for example, to the search manager 206. The search manager 206 can then use a document-identifier based hash algorithm to compute a hash value for each document. In this regard, a hash value associated with the document is computed using the document identifier of a matched document. Such a hash value can be used by the search manager 206 to identify which virtual ranking index unit and/or virtual content index unit contains the document such that caption data and ranking data can be obtained.

As such, the search manager 206 can select a machine (e.g., from among a plurality of machines) associated with the identified virtual ranking index unit and the identified virtual content index unit for a particular matched document. The particular machine from the virtual ranking index unit and the virtual content index unit can be selected in any manner. For example, a particular machine selected for processing a query may be selected systematically, randomly, based on workload, based on capacity, or the like.

The machine associated with the virtual ranking index unit can determine, identify, lookup, etc. ranking data for a particular matched document. Ranking data refers to any type of data that indicates, describes, or specifies a ranking for the document. In embodiments, ranking data may be a relevance score for the document. Such a relevance score can be used to determine the order of search results provided to a user. The documents can be analyzed using a ranking algorithm to identify documents that represent a highest ranked match for the query. The identified documents can be any convenient number, such as at least about 10 documents per machine, or at least about 20 documents per machine, or at least about 50 documents per machine, or a larger number. The matched documents can then be ranked based on various properties, such as properties embodied in a set of relevance algorithms.

The machine associated with the virtual content index unit can determine, identify, lookup, etc. content data for a particular matched document. Content data refers to any type of data that indicates, describes, specifies, or represents content associated with the document. Such content data may include summary information (e.g., a snippet) or the content data can be utilized to generate a snippet for the document. As can be appreciated, in some embodiments, content data is obtained for each matched document. In other embodiments, content data is obtained for documents having ranking data meeting a specific threshold. For example, in some cases, content may be obtained for the top ranked documents (e.g., 20 documents), as determined by the virtual ranking index unit. The resulting documents, or indications or portions thereof, can then be displayed to a user based on the relative rankings.

Figure 6:
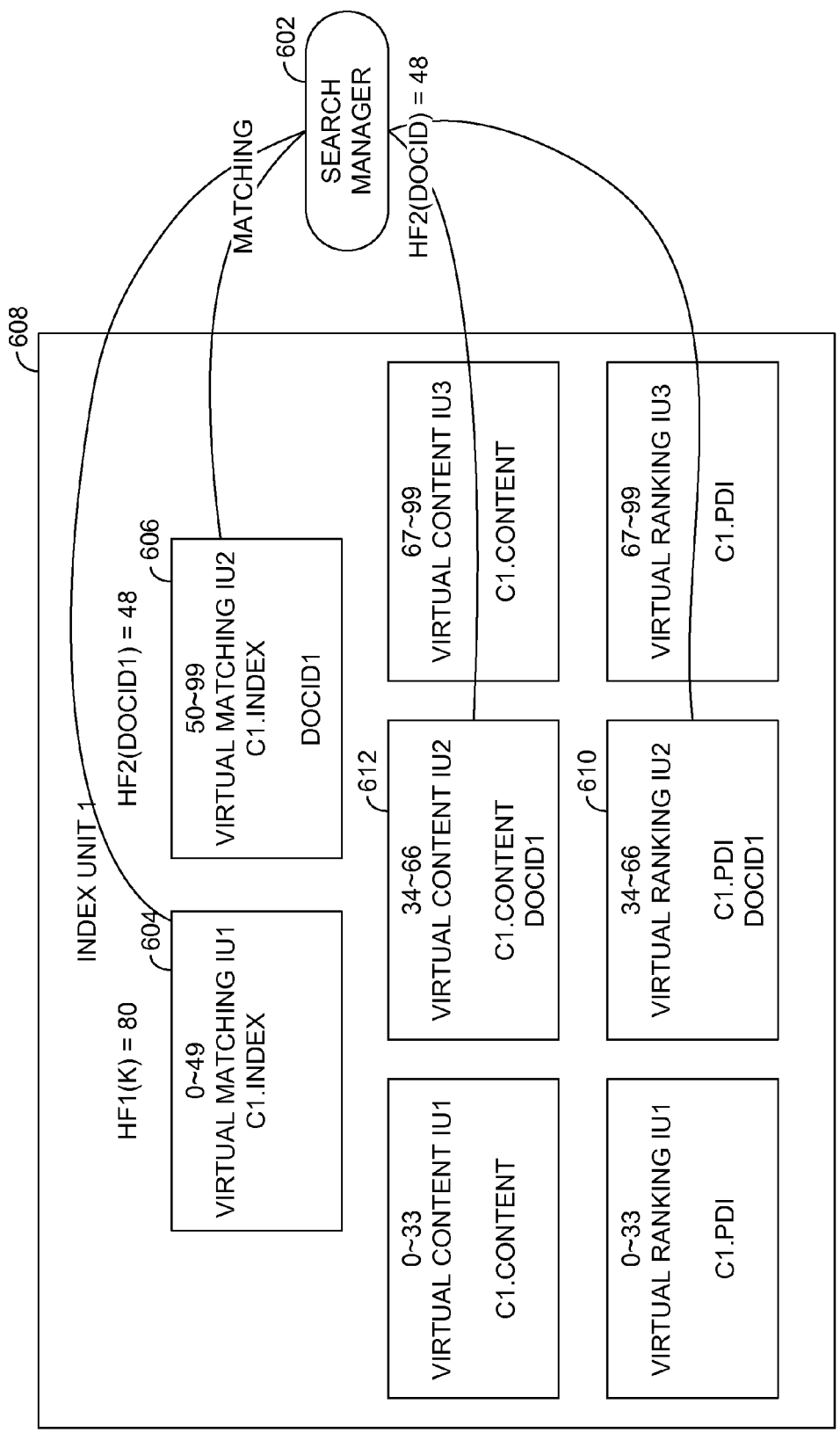
FIG. 6 is a schematic diagram illustrating an example for processing a query, according to embodiments of the present invention.

By way of example, and with reference to FIG. 6, assume that the search manager 602 receives a query. The search manager 602 can select a machine associated with the virtual matching index unit 604 and a machine associated with the virtual matching index unit 606 associated with the index unit 608. Thereafter, the query, or portion thereof, can be transmitted to the selected machines for relevance matching. Upon being returned an identification of a matching document, the search manager 602 can use the document identifier to compute a hash value. Assume that the hash value of the document identifier equals 48. The hash value of 48 can then be utilized to recognize that a machine from virtual ranking index unit 610 is to be used to obtain ranking data (e.g., fetch a per-document index (PDI)). Further, such a hash value can be utilized to recognize that a machine from virtual content index unit 612 is to be used to obtain content data (e.g., fetch a caption associated with the matched document).

Exemplary methods for facilitating generation and/or utilization of a customized index are described with reference to FIGS. 7-8. These exemplary methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network or a communication cloud. In a distributed computing environment, computer executable instructions may be located both in local and remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual operations may be omitted from the methods without departing from the spirit and scope of the subject matter described herein. In the context of software, the blocks represent computer instructions that, when executed by one or more processors, perform the recited operations.

Figure 7:
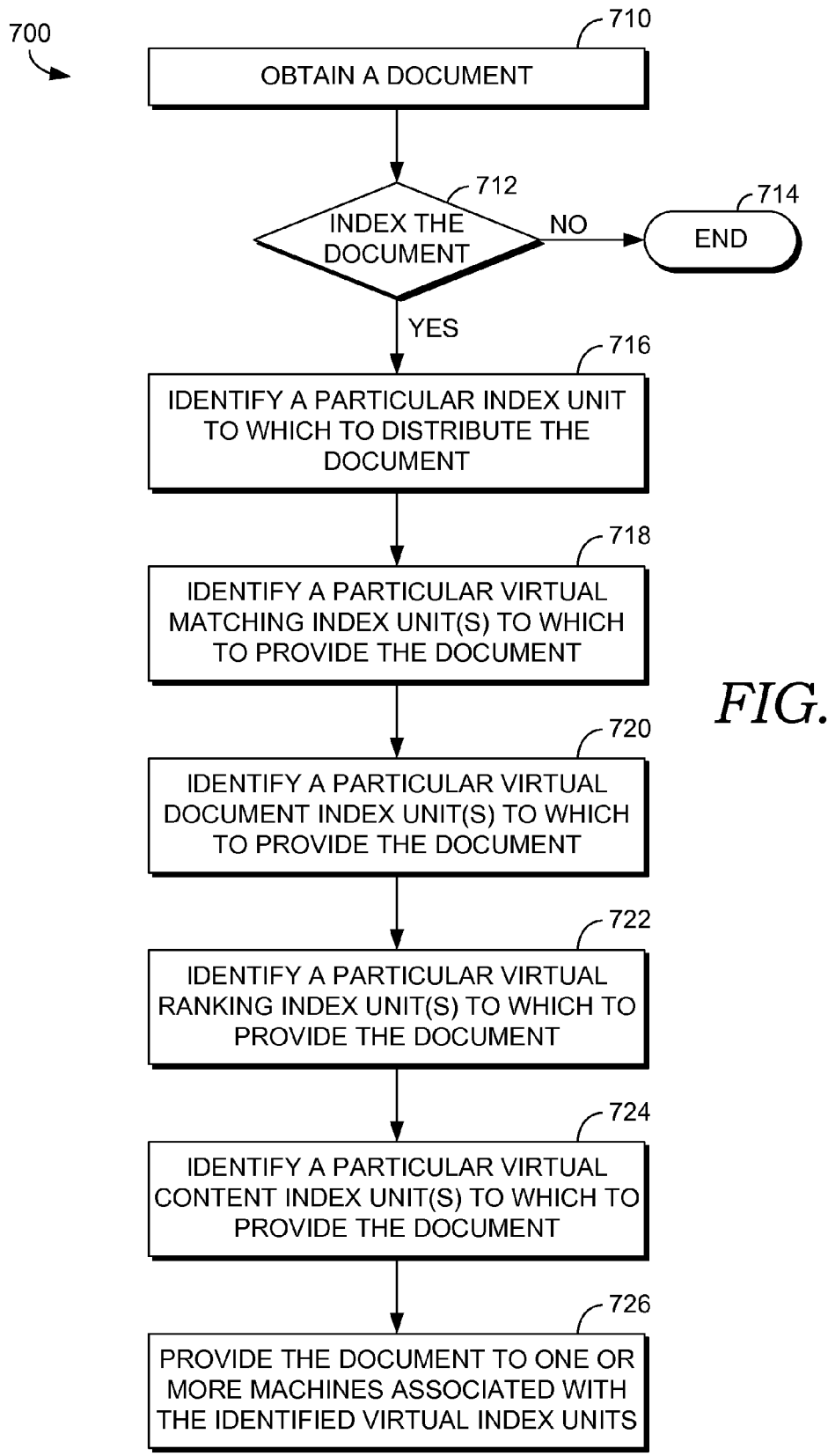
FIG. 7 illustrates an exemplary method of distributing documents within a customized index, in accordance with an embodiment of the present invention.

FIG. 7 illustrates an exemplary method 700 of distributing documents within a customized index. The method 700 is described in the context of a document distributor, such as document distributor 204 of FIG. 2, for ease of illustration, but is not limited to being performed in accordance therewith. Initially, as indicated at block 710, a document, such as a web page is obtained. At block 712, a determination of whether to index the document, or data associated therewith, is made. If it is determined that the document is not to be indexed, the method ends at block 714. On the other hand, if it is determined that the document is to be indexed, at block 716, a particular index unit to which to distribute the document is identified. Such an identification can be completed, for example, by calculating a hash value for the document (e.g., based on a document key) and using the hash value to select the index unit having a corresponding hash value range. At block 718, a particular virtual matching index unit(s) to which to provide the document is identified. In this regard, a virtual matching index unit can be selected from among a group of virtual matching index units, for example, using a hash value calculated for the document based on a document key. At block 720, a particular virtual document index unit(s) to which to provide the document is identified. In embodiments, a virtual document index unit can be selected from among a group of virtual matching index units, for example, using a hash value calculated for the document based on a document key.

At block 722, a particular virtual ranking index unit(s) to which to provide the document is identified. In some implementations, a virtual ranking index unit can be selected from among a group of virtual ranking index units, for example, using a hash value computed based on a document identifier assigned to the document. Similarly, at block 724, a particular virtual content index unit(s) to which to provide the document is identified. In some implementations, a virtual content index unit can be selected from among a group of virtual content index units, for example, using a hash value computed based on a document identifier assigned to the document. At block 726, one or more machines associated with the identified virtual index units are provided the document, and/or data associated therewith. The machines can add the document to the indices or generate new indices in any manner. For instance, in some embodiments, a two-phase document adding process is performed to maintain integrity of the index, or portion thereof, during query serving.

Figure 8:
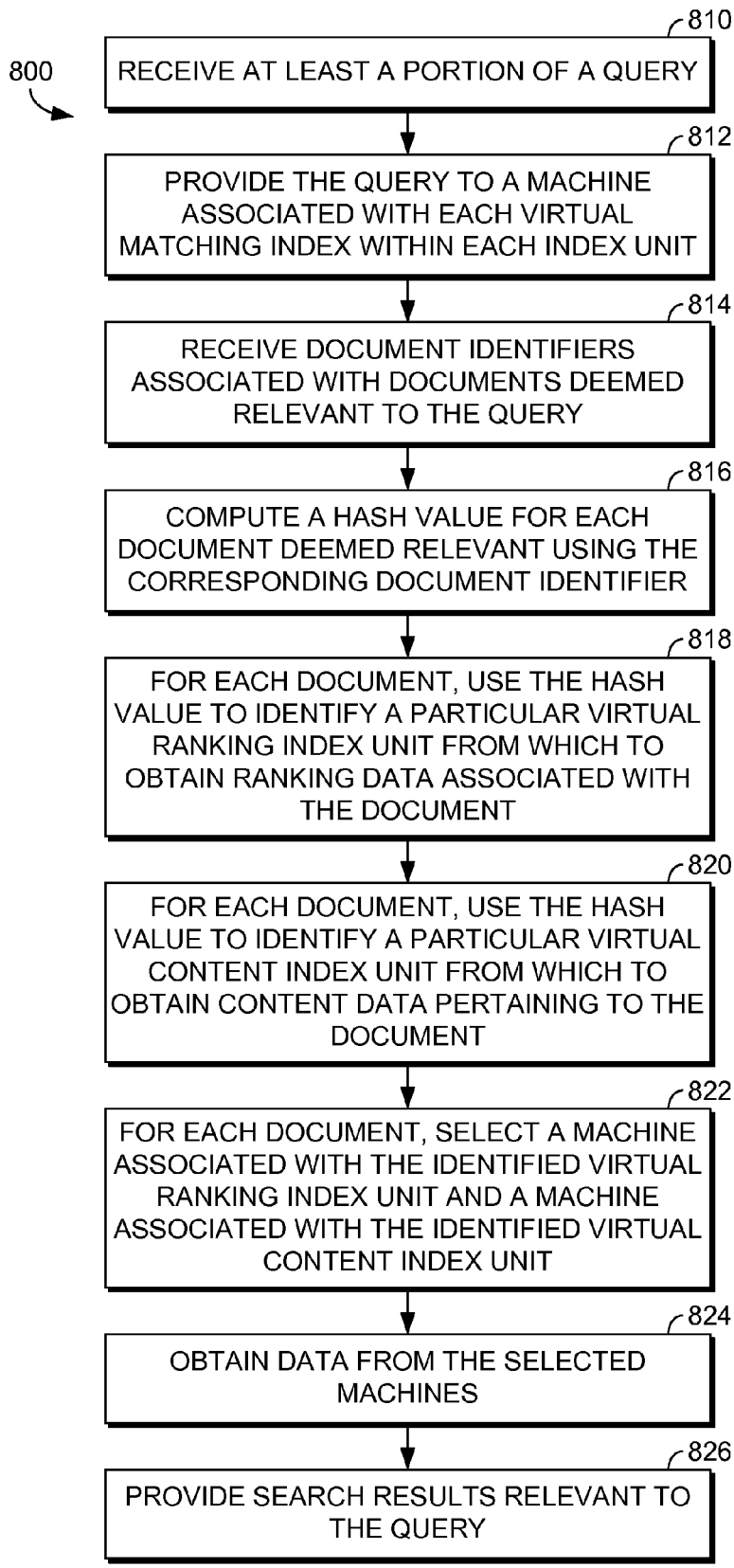
FIG. 8 illustrates an exemplary method of managing a search to obtain relevant search results, in accordance with an embodiment of the present invention.

Turning now to FIG. 8, FIG. 8 illustrates an exemplary method 800 of managing a search to obtain relevant search results. The method 800 is described in the context of a search manager, such as search manager 206 of FIG. 2, for ease of illustration, but is not limited to being performed in accordance therewith. Initially, as indicated at block 810, at least a portion of a query is received. Subsequently, at block 812, the at least a portion of the query is provided a machine associated with each virtual matching index within each index unit. In embodiments, a machine associated with each virtual matching index within each index unit can be selected in any number of ways. Document identifiers associated with documents deemed relevant to the query are received, as indicated at block 814. Thereafter, at block 816, a hash value is computed for each document deemed relevant using the corresponding document identifier. At block 818, for each document, the hash value is used to identify a particular virtual ranking index unit from which to obtain ranking data associated with the document. Similarly, at block 820, for each document, the hash value is used to identify a particular virtual content index unit from which to obtain content data pertaining to the document.

At block 822, for each document, a machine associated with the identified virtual ranking index unit and a machine associated with the identified virtual content index unit is selected. At block 824, data is obtained from each selected machine. Such data can include, for example, ranking data and/or content data. At block 826, search results relevant to the at least the portion of the query are provided, for example, to a user device for display to a user. Presentation of such search results can be derived from received ranking data and/or content data, for example.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:

1. One or more hardware computer-storage media storing computer-useable instructions that, when executed by a computing device, perform a method for distributing documents, comprising:
    identifying a particular virtual matching index unit located within an index unit to provide a document to, wherein one or more machines associated with the particular virtual matching index unit have a same matching index portion;
    identifying a particular virtual ranking index unit from among a plurality of virtual ranking index units located within the index unit to provide the document to, wherein the virtual ranking index unit is utilized to generate a relevance score for the document, and wherein one or more machines associated with the particular virtual ranking index unit have a same ranking index portion;
    identifying a particular virtual content index unit from among a plurality of virtual content index units located within the index unit to provide the document to, wherein one or more machines associated with the particular virtual content index unit have a same content index portion; and
    providing the document to each of the one or more machines associated with the identified virtual matching index unit that is located within the index unit, each of the one or more machines associated with the identified virtual ranking index unit that is located within the index unit, and each of the one or more machines associated with the identified virtual content index unit that is located within the index unit, wherein the number of machines associated with each type of index is customized, wherein the one or more machines associated with the identified virtual ranking index unit determine data that indicates a ranking for the document, and wherein the one or more machines associated with the identified virtual content index unit determine content data that indicates content associated with the document.

2. The hardware computer-storage media of claim 1 further comprising identifying a particular virtual document index unit from among a plurality of virtual document index units within the index unit to provide the document to, wherein one or more machines associated with the particular virtual document index unit have a same document index portion.

3. The hardware computer-storage media of claim 2 further comprising providing the document to each of the one or more machines associated with the identified virtual document index unit.

4. The hardware computer-storage media of claim 3, wherein the particular virtual document index unit within the index unit to which to provide the document is identified using a hash value computed based on a document key associated with the document.

5. The hardware computer-storage media of claim 1, wherein the particular virtual matching index unit within the index unit to which to provide the document is identified using a hash value computed based on a document key associated with the document.

6. The hardware computer-storage media of claim 1, wherein the particular virtual ranking index unit within the index unit to which to provide the document is identified using a hash value computed based on a document identifier assigned to the document.

7. The hardware computer-storage media of claim 1, wherein the particular virtual content index unit within the index unit to which to provide the document is identified using a hash value computed based on a document identifier assigned to the document.

8. The hardware computer-storage media of claim 1 further comprising assigning the document identifier to the document.

9. A computer-implemented method for distributing documents, comprising:
    identifying a particular virtual matching index unit located within an index unit to provide a document to, wherein one or more machines associated with the particular virtual matching index unit have a same matching index portion;
    identifying a particular virtual ranking index unit from among a plurality of virtual ranking index units located within the index unit to provide the document to, wherein the virtual ranking index unit is utilized to generate a relevance score for the document, and wherein one or more machines associated with the particular virtual ranking index unit have a same ranking index portion;
    identifying a particular virtual content index unit from among a plurality of virtual content index units located within the index unit to provide the document to, wherein one or more machines associated with the particular virtual content index unit have a same content index portion; and
    providing the document to each of the one or more machines associated with the identified virtual matching index unit that is located within the index unit, each of the one or more machines associated with the identified virtual ranking index unit that is located within the index unit, and each of the one or more machines associated with the identified virtual content index unit that is located within the index unit, wherein the number of machines associated with each type of index is customized, wherein the one or more machines associated with the identified virtual ranking index unit determine data that indicates a ranking for the document, and wherein the one or more machines associated with the identified virtual content index unit determine content data that indicates content associated with the document.

10. The method of claim 9 further comprising identifying a particular virtual document index unit from among a plurality of virtual document index units within the index unit to provide the document to, wherein one or more machines associated with the particular virtual document index unit have a same document index portion.

11. The method of claim 10 further comprising providing the document to each of the one or more machines associated with the identified virtual document index unit.

12. The method of claim 9, wherein the particular virtual matching index unit within the index unit to which to provide the document is identified using a hash value computed based on a document key associated with the document.

13. The method of claim 9, wherein the particular virtual ranking index unit within the index unit to which to provide the document is identified using a hash value computed based on a document identifier assigned to the document.

14. The method of claim 9, wherein the particular virtual content index unit within the index unit to which to provide the document is identified using a hash value computed based on a document identifier assigned to the document.

15. A computing system comprising:
    a processor; and
    computer storage memory having computer-executable instructions stored thereon which, when executed by the processor, configure the computing system to:
    identify a particular virtual matching index unit located within an index unit to provide a document to, wherein one or more machines associated with the particular virtual matching index unit have a same matching index portion;
    identify a particular virtual ranking index unit from among a plurality of virtual ranking index units located within the index unit to provide the document to, wherein the virtual ranking index unit is utilized to generate a relevance score for the document, and wherein one or more machines associated with the particular virtual ranking index unit have a same ranking index portion;
    identify a particular virtual content index unit from among a plurality of virtual content index units located within the index unit to provide the document to, wherein one or more machines associated with the particular virtual content index unit have a same content index portion; and
    provide the document to each of the one or more machines associated with the identified virtual matching index unit that is located within the index unit, each of the one or more machines associated with the identified virtual ranking index unit that is located within the index unit, and each of the one or more machines associated with the identified virtual content index unit that is located within the index unit, wherein the number of machines associated with each type of index is customized, wherein the one or more machines associated with the identified virtual ranking index unit determine data that indicates a ranking for the document, and wherein the one or more machines associated with the identified virtual content index unit determine content data that indicates content associated with the document.

16. The system of claim 15 further configured to identify a particular virtual document index unit from among a plurality of virtual document index units within the index unit to provide the document to, wherein one or more machines associated with the particular virtual document index unit have a same document index portion.

17. The system of claim 16 further configured to provide the document to each of the one or more machines associated with the identified virtual document index unit.

18. The system of claim 15, wherein the particular virtual matching index unit within the index unit to which to provide the document is identified using a hash value computed based on a document key associated with the document.

19. The system of claim 15, wherein the particular virtual ranking index unit within the index unit to which to provide the document is identified using a hash value computed based on a document identifier assigned to the document.

20. The system of claim 15, wherein the particular virtual content index unit within the index unit to which to provide the document is identified using a hash value computed based on a document identifier assigned to the document.

\* \* \* \* \*